United States Patent
Abduljaber et al.

(10) Patent No.: US 12,489,748 B2
(45) Date of Patent: Dec. 2, 2025

(54) DEVICE TO DEVICE BINDING FOR PUSH APPROVAL

(71) Applicant: Cisco Technology, Inc., San Jose, CA (US)

(72) Inventors: Omar Naji Abduljaber, Ypsilanti, MI (US); Michael G. Brown, Portland, OR (US); Mujtaba Hussain, Canton, MI (US); Robert Jacob Linial Small, Ann Arbor, MI (US); Bradley A. Kuykendall, Colorado Springs, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 223 days.

(21) Appl. No.: 18/065,002

(22) Filed: Dec. 13, 2022

(65) Prior Publication Data
US 2024/0195804 A1    Jun. 13, 2024

(51) Int. Cl.
H04L 9/40    (2022.01)
(52) U.S. Cl.
CPC ................................. H04L 63/0853 (2013.01)
(58) Field of Classification Search
CPC ... H04L 63/0853; H04L 63/108; H04L 63/18; H04L 2463/082; G06F 21/40; H04W 12/61
See application file for complete search history.

(56) References Cited

U.S. PATENT DOCUMENTS

| | | |
|---|---|---|
| 10,122,719 B1 | 11/2018 | Vltavsky et al. |
| 2002/0169988 A1 | 11/2002 | Vandergeest et al. |
| 2014/0189840 A1 | 7/2014 | Metke et al. |
| 2016/0241605 A1 | 8/2016 | Taboriskiy et al. |
| 2017/0359342 A1 | 12/2017 | Magyar et al. |

(Continued)

OTHER PUBLICATIONS

Anonymous: "Duo Universal Prompt—Guide to Two-Factor Authentication", Duo Security, Oct. 17, 2022, pp. 1-50, XP093137704, Retrieved from https://web.archive.org/web/20221017100201/https://guide.duo.com/universal-prompt on Mar. 5, 2024, The Whole Document.

(Continued)

*Primary Examiner* — Taghi T Arani
*Assistant Examiner* — Blake I Narramore
(74) *Attorney, Agent, or Firm* — Baker Botts L.L.P.

(57) ABSTRACT

In one embodiment, a method, by an authentication server, includes receiving user information associated with a first authentication factor for verification from the first endpoint device. The method further includes in response to verifying the first authentication factor, transmitting a prompt to provide an authentication decision associated with a second authentication factor to the second endpoint device, wherein the second endpoint device is communicatively coupled to the first endpoint device through the communication link. The method further includes receiving the authentication decision that is initiated by the first endpoint device from the second endpoint device, wherein the first endpoint device is configured to initiate and transmit the authentication decision to the second endpoint device in response to receiving the second authentication factor from the second endpoint device.

20 Claims, 4 Drawing Sheets

(56) References Cited

U.S. PATENT DOCUMENTS

| | | | |
|---|---|---|---|
| 2018/0097901 A1 | 4/2018 | Ramachandra | |
| 2019/0188368 A1 | 6/2019 | Hastings | |
| 2019/0372959 A1* | 12/2019 | Pattar | H04L 63/083 |
| 2021/0176229 A1* | 6/2021 | Xuan | H04L 63/0853 |
| 2021/0194883 A1* | 6/2021 | Badhwar | H04L 63/107 |
| 2022/0070156 A1* | 3/2022 | Thubert | H04L 63/108 |
| 2022/0092162 A1* | 3/2022 | Keith, Jr. | G06F 21/35 |
| 2022/0116392 A1* | 4/2022 | Shah | H04L 63/0876 |
| 2022/0166763 A1* | 5/2022 | Hong | H04L 67/10 |
| 2022/0247789 A1* | 8/2022 | Itoi | G06F 3/0482 |
| 2022/0417240 A1* | 12/2022 | Zhang | H04L 41/0895 |
| 2023/0119797 A1* | 4/2023 | Fabjanski | H04W 12/08 |
| | | | 340/5.61 |
| 2023/0216850 A1* | 7/2023 | Pasirstein | H04L 63/18 |
| | | | 726/4 |
| 2023/0245082 A1* | 8/2023 | Venu | G06K 7/10366 |
| | | | 705/44 |

OTHER PUBLICATIONS

International Search Report and Written Opinion for International Application No. PCT/US2023/081997, mailed Mar. 20, 2024, 16 Pages.

\* cited by examiner

DEVICE TO DEVICE BINDING FOR PUSH APPROVAL

TECHNICAL FIELD

The present disclosure relates generally to communication networks, and more particularly, to device to device binding for push approval.

BACKGROUND

Authentication is the process of an entity proving its identity to another entity. An individual may gain access to a computer system by identifying and authenticating themselves using a login. Logins are used by computers, applications, and websites to prevent unauthorized access to confidential data. Currently, users can log into their devices by using a combination of a username and password. The username uniquely identifies the user using the device and the password is used to authenticate the user to the device. However, passwords can be cumbersome. Easy-to-remember passwords and the repetitive use of the same password may present security issues, and users may forget their passwords.

DESCRIPTION OF EXAMPLE EMBODIMENTS

Overview

Figure 1:
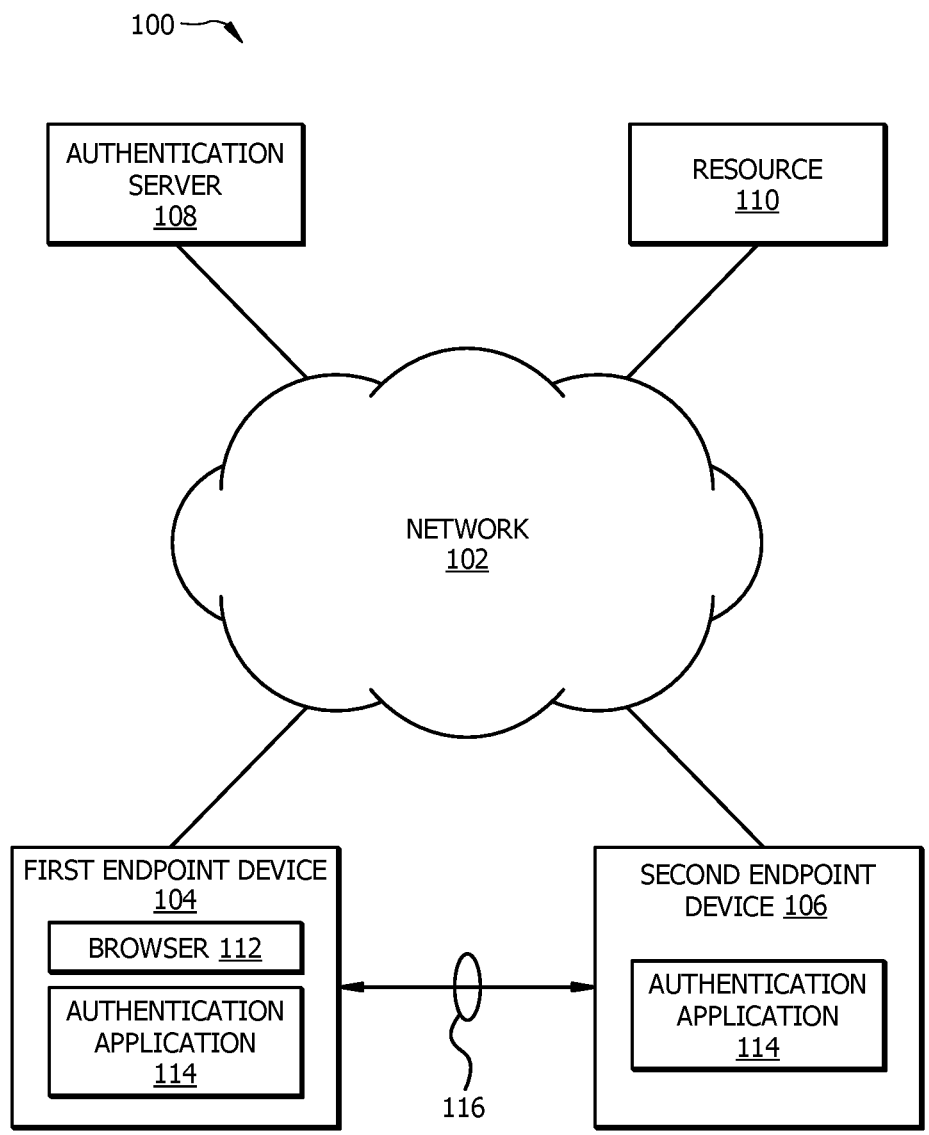
FIG. 1 illustrates an example network to authenticate an endpoint device.

In particular embodiments, an authentication server may comprise one or more processors and one or more computer-readable non-transitory storage media coupled to one or more of the processors. The one or more computer-readable non-transitory storage media may comprise instructions operable when executed by one or more of the processors to cause the authentication server to receive user information associated with a first authentication factor for verification from a first endpoint device. The processors may be operable when executing the instructions to transmit a prompt to provide an authentication decision associated with a second authentication factor to a second endpoint device in response to verifying the first authentication factor, wherein the second endpoint device is communicatively coupled to the first endpoint device through a communication link. The processors may be operable when executing the instructions to receive the authentication decision that is initiated by the first endpoint device from the second endpoint device, wherein the first endpoint device is configured to initiate and transmit the authentication decision to the second endpoint device in response to receiving the second authentication factor from the second endpoint device.

In particular embodiments, a method, by an authentication server, to authenticate a first endpoint device through a communication link with a second endpoint device may comprise receiving user information associated with a first authentication factor for verification from a first endpoint device. The method may further comprise transmitting a prompt to provide an authentication decision associated with a second authentication factor to a second endpoint device in response to verifying the first authentication factor, wherein the second endpoint device is communicatively coupled to the first endpoint device through a communication link. The method may further comprise receiving the authentication decision that is initiated by the first endpoint device from the second endpoint device, wherein the first endpoint device is configured to initiate and transmit the authentication decision to the second endpoint device in response to receiving the second authentication factor from the second endpoint device.

In particular embodiments, one or more computer-readable non-transitory storage media may embody software that is operable on an authentication server, when executed, to: receive user information associated with a first authentication factor for verification from a first endpoint device. The software may be operable when executed to transmit a prompt to provide an authentication decision associated with a second authentication factor to a second endpoint device in response to verifying the first authentication factor, wherein the second endpoint device is communicatively coupled to the first endpoint device through a communication link. The software may be operable when executed to receive the authentication decision that is initiated by the first endpoint device from the second endpoint device, wherein the first endpoint device is configured to initiate and transmit the authentication decision to the second endpoint device in response to receiving the second authentication factor from the second endpoint device.

Technical advantages of certain embodiments of this disclosure may include one or more of the following. Certain systems and methods described herein use a communication link between endpoint devices to authenticate a user, which may allow interaction to be limited to the same initial endpoint device rather than separate devices. For example, in certain authentication processes, the device requesting access to a resource may need to be authenticated prior to authorizing the access, but that device may not be registered to perform authentication processes. A secondary device may need to be utilized to perform the authentication processes for the first initial device. In certain embodiments, the communication link allows communications between the secondary device and an authentication server to be pushed to the first initial device for user input. The authentication server can then grant access based on user interaction with a singular device rather than with two separate devices.

Certain embodiments of this disclosure improve the user experience by eliminating password and secrets fatigue while providing unified access to several applications and services. In certain embodiments, security is strengthened by reducing and/or eliminating password management techniques, which may reduce credential theft and/or impersonation. In some embodiments, the embodiments described herein simplify information technology (IT) operations by reducing and/or eliminating the need to issue, secure, rotate, reset, and/or manage passwords.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In general, a user of an endpoint device may authenticate with an authentication server in connection with accessing a resource. The authentication server may perform a procedure that includes authenticating a first authentication factor and a second authentication factor. Authenticating the first authentication factor may include verifying that endpoint device has provided valid login credentials associated with the user. Examples of login credentials include a username and password. Authenticating the second authentication factor may include performing a real-time verification of the user of endpoint device. For example, the authentication server may verify whether the user of the endpoint device responds affirmatively and promptly to a prompt for an authentication decision. In certain examples, the endpoint device providing the first authentication factor may not be registered to communicate with the authentication server to provide the second authentication factor. The present disclosure contemplates establishing a communication link between a first endpoint device and a second endpoint device, where the second endpoint device may be registered to communicate with the authentication server and the first endpoint device is not. The communication link allows a user to actively engage with the first endpoint device without the need to use the second endpoint device by forwarding communications along the communication link to the authentication server.

FIG. 1 illustrates an example system 100 for authenticating an endpoint device. System 100 or portions thereof may be associated with an entity, which may include any entity, such as a business, company, or enterprise, configured to authenticate a user. In certain embodiments, the entity may be a service provider that provides authentication and/or security services. The components of system 100 may include any suitable combination of hardware, firmware, and software. For example, the components of system 100 may use one or more elements of the computer system of FIG. 4. In the illustrated embodiment of FIG. 1, system 100 includes a network 102, a first endpoint device 104, a second endpoint device 106, an authentication server 108, and a resource 110.

Network 102 of system 100 is any type of network that facilitates communication between components of system 100. Network 102 may connect one or more components of system 100. One or more portions of network 102 may include an ad-hoc network, the Internet, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 102 may include one or more different types of networks.

Network 102 may be any communications network, such as a private network, a public network, a connection through the Internet, a mobile network, a WI-FI network, etc. Network 102 may include a core network, an access network of a service provider, an Internet service provider (ISP) network, and the like. One or more components of system 100 may communicate over network 102. Network 102 may include one or more nodes. Nodes are connection points within network 102 that receive, create, store and/or send data along a path. Nodes may include one or more redistribution points that recognize, process, and forward data to other nodes of network 102. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. The nodes of network 102 may include one or more devices.

First endpoint device 104 and second endpoint device 106 may each refer to a device that a user uses to communicate with other components of system 100 via network 102. A user of system 100 may be a person or group of persons who utilize one or more devices of system 100. The user may be associated with one or more accounts. The user may be a local user, a remote user, an administrator, a customer, a company, a combination thereof, and the like. The user may be associated with a username, a password, a user profile, etc.

Examples of the first endpoint device 104 and second endpoint device 106 may include a desktop computer system, a laptop or notebook computer system, a mobile telephone (such as a smartphone), a personal digital assistant (PDA), a tablet computer system, and so on. In certain embodiments, first endpoint device 104 and/or second endpoint device 106 may include a liquid crystal display (LCD), an organic light-emitting diode (OLED) flat screen interface, digital buttons, a digital keyboard, physical buttons, a physical keyboard, one or more touch screen components, a graphical user interface (GUI), and the like. The user may further use first endpoint device 104 and/or second endpoint device 106 to receive and respond to certain authentication factors. For example, the user may have an account established with a policy server (e.g., Cisco® Identity Services Engine (ISE)), and the user may have pre-configured the account such that second authentication factors are pushed to an application running on the first endpoint device 104 and/or second endpoint device 106. As one example, the user may have an account established with an authentication application, such as Cisco Duo®, and the user may have pre-configured the account such that authentication prompts, such as Duo-pushes, are pushed to a Duo® Connect application running on first endpoint device 104 and/or second endpoint device 106.

In certain embodiments, first endpoint device 104 may include a user's browser 112, one or more client applications, and an instance of an authentication application 114. As an example, user's browser 112 may represent a web browser (e.g., application software for accessing the World Wide Web). Browser 112 may be a software program that allows a user to view web pages on a device. In certain embodiments, browser 112 is installed on one or more devices of system 100. Browser 112 may include a GUI for displaying and navigating between web pages. In some embodiments, browser 112 retrieves content from a website's web server and displays the content on one or more devices, such as first endpoint device 104. Browser 112 may be one of the following types of browsers: Google Chrome, Mozilla Firefox, Edge, Safari, Opera, Konqueror, Lynx, Vivaldi, and the like. In certain embodiments, browser 112 may be supported by authentication server 108. In some embodiments, a user of a device uses browser 112 installed on the device to log into device.

A client application may include a computer program configured to carry out a specific task used by the user. Examples of a client application may include a remote desktop application, an email application, a word processing application, a spreadsheet application, a slide presentation application, a media player application, a business-specific application (such as accounting software), or other application. In certain embodiments, the client application includes a thick application (e.g., an application that runs on an endpoint device, for example, such that most of the logic is handled locally by the endpoint device).

Authentication server 108 of system 100 may be computer hardware and/or software (e.g., a computer program) that provides authentication services to devices, such as sharing data and/or resources with devices and/or performing computation for devices. In certain embodiments, authentication server 108 is a security platform that provides authentication services (e.g., MFA, two-factor authentication (2FA), etc.), endpoint security, remote access solutions, device health, and the like. The authentication server 108 may perform a procedure that includes authenticating a first authentication factor and a second authentication factor. Authenticating the first authentication factor may include verifying that first endpoint device 104 and/or second endpoint device 106 has provided valid login credentials associated with the user. Authenticating the second authentication may include performing a real-time verification of the user of first endpoint device 104 and/or second endpoint device 106. For example, authentication server 108 may verify whether the user of the first endpoint device 104 and/or second endpoint device 106 responds affirmatively and promptly to a prompt (e.g., a Duo prompt, such as a Duo push notification) configured or managed by a service provider.

As discussed above, the multi-factor authentication procedure may include a real-time verification factor. The real-time verification includes any suitable verification that obtains an input from the user in real time. The real-time verification of the user may be performed in any suitable manner. As an example, the real-time verification may ask the user to supply a one-time passcode (e.g., a passcode pushed to or generated by an application running on the user's smartphone or computer, a passcode obtained from a hardware token issued to the user, a passcode sent to the user by text message or phone call, etc.). As another example, the real-time verification may ask the user to acknowledge a notification, such as by accepting a prompt pushed to the user's smartphone or computer via an application or text message, or by accepting a phone call notification (e.g., by pressing "1" or saying "yes" when prompted). In embodiments implemented using a Duo system, the real-time verification may be a Duo prompt (such as a Duo push, which may push a login request to an endpoint device associated with the user—the user reviews the login request and taps Approve to log in).

The real-time verification may be performed using any suitable endpoint device associated with the user (e.g., first endpoint device 104 and/or second endpoint device 106). The endpoint device may be the same endpoint device as that used to authenticate with and then access resource 110, or a different endpoint device associated with the user may be used. As an example, the user may seek to access the resource 110 using a laptop of the user. In one embodiment, the real-time verification may be performed using the same laptop. In another embodiment, the real-time verification may be performed using a different endpoint device, such as the user's smartphone. For example, authentication server 108 may authenticate login credentials (e.g., username and password) received from the user's laptop and may then push a real-time verification request to the user's smartphone. The authentication may determine to push the real-time verification request to the user's smartphone based on information configured for a user account that a service provider associates with the user. For example, the user may have pre-configured the user account to send real-time verification requests to the user's smartphone.

The resource 110 may refer to a resource for which multi-factor authentication is enforced. Depending on the embodiment, an authentication factor may be enforced by authentication server 108, the resource 110 itself, a service provider, and/or any other suitable component. Certain embodiments enforce each authentication factor at the same component (as one example, authentication server 108 may enforce both the first authentication factor and the second authentication factor), and other embodiments use more than one component to enforce the authentication factors (as one example, authentication server 108 may enforce the first authentication factor, and a service provider may enforce the second authentication factor).

The resource 110 may be located outside of an organization network and/or within an organization network. In certain embodiments, an endpoint device communicates with resource 110 via a browser (such as browser 112). In such embodiments, resource 110 may be any resource that is accessed through the browser and protected by multi-factor authentication. As an example, first endpoint device 104 may communicate with resource 110 via user's browser 112. As another example, first endpoint device 104 may communicate with resource 110 via an embedded browser of a client application or an external browser triggered by a client application.

In embodiments, both the first endpoint device 104 and the second endpoint device 106 may include an instance of the authentication application 114. The authentication application 114 may be a mobile, software, and/or web application that a user may log into to access information and/or to communicate with authentication server 108. The user may be verified using multi-factor authentication to use the authentication application 114.

Both first endpoint device 104 and second endpoint device 106 may be communicatively coupled to authentication server 108 through the network 102. In embodiments, the first endpoint device 104 may not be registered to perform the real-time verification of the second authentication factor during multi-factor authentication, but the second endpoint device 106 may be registered and/or configured to perform the real-time verification. In these embodiments, a communication link 116 may be established between the first endpoint device 104 and the second endpoint device 106 to forward transmission from the authentication server 108 to the first endpoint device 104 and from the first endpoint device 104 to the authentication server 108. In these embodiments, the second endpoint device 106 may be an intermediary node during transmissions.

Communication link 116 represents any suitable hardware and/or software that facilitates communication between components in network 102. Communication link 116 may use various IP-based communication protocols to carry data packets within network 102. Communication link 116 may include near-field communications protocols, Bluetooth, and the like. First endpoint device 104 and authentication server 108 may communicate via communication link 116. First endpoint device 104 may establish the communication link 116 with second endpoint device 106 as a distance between the devices 104, 106 decreases to within a threshold value. For example, the communication link 116 may be established when a distance between the devices 104, 106 is less than about 10 meters. If the distance exceeds the threshold value, the communication link 116 may disconnect, but re-connection may occur if the distance between devices 104, 106 decreases again to below the threshold value. In embodiments, the communication link 116 may be established via the authentication application 114 installed on the devices 104, 106, in which the authentication application 114 may be configured to pair the devices 104, 106. In embodiments, the authentication application 114 may be open and running on the first endpoint device 104 and/or the second endpoint device 106 to establish the communication link 116.

Although FIG. 1 describes and illustrates particular components, devices, or systems carrying out particular actions, this disclosure contemplates any suitable combination of any suitable components, devices, or systems carrying out any suitable actions.

Figure 2:
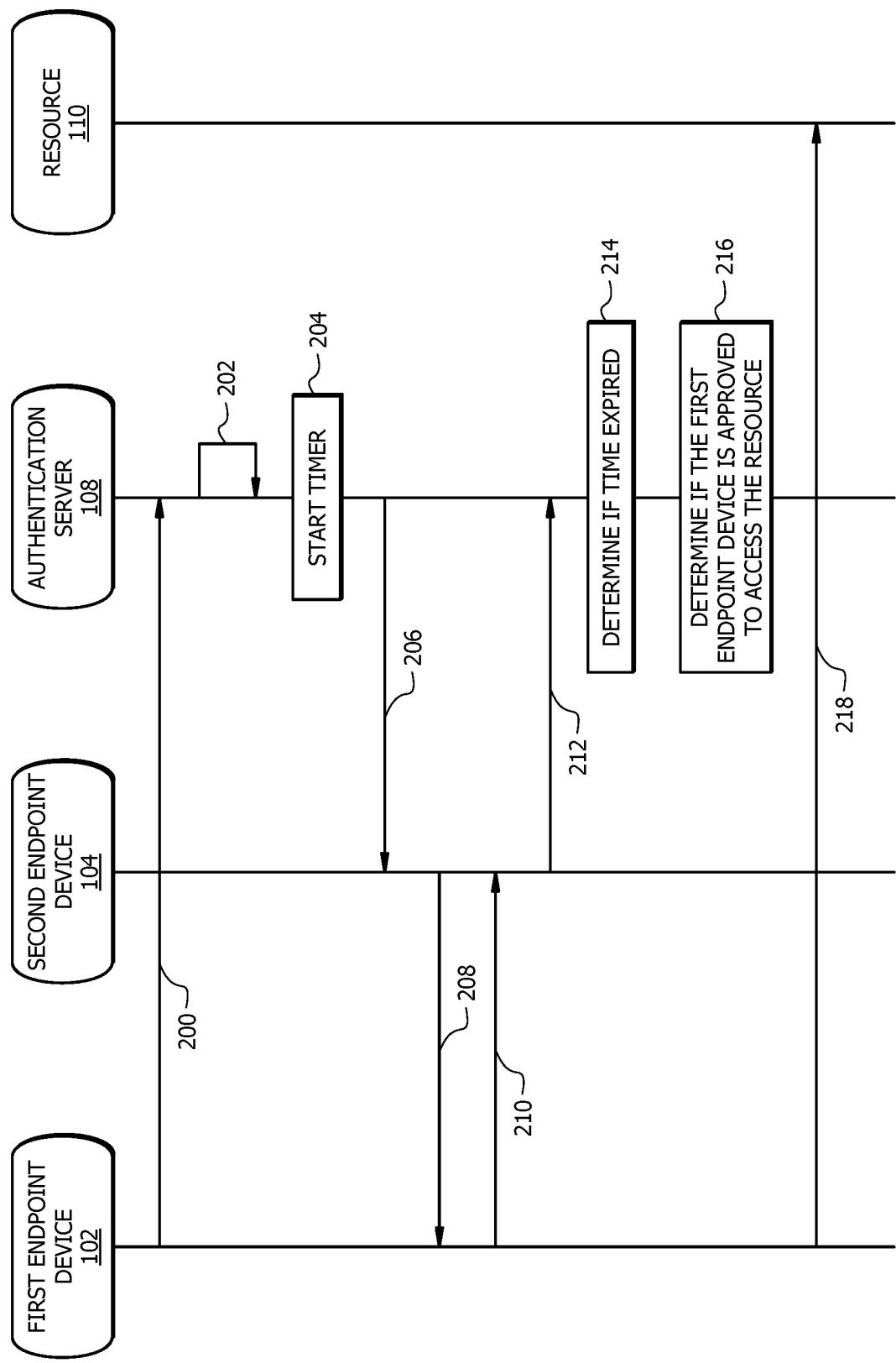
FIG. 2 illustrates an example message flow to authenticate an endpoint device.

FIG. 2 illustrates an example traffic relay between first endpoint device 104, second endpoint device 106, authentication server 108, and resource 110. The illustrated traffic relay of FIG. 2 may be used by system 100 of FIG. 1. At step 200, a user may begin logging into a webpage through browser 112 or into a client application installed on the first endpoint device 104 to access a resource 110. The user may be redirected to provide user information as log-in credentials associated with a first authentication factor for verifying the first endpoint device. At step 202, the authentication server 108 may receive the user information and perform a first multi-factor authentication procedure by authenticating the first authentication factor, where authentication of the first authentication factor is based on verifying the login credential with the received user information. At step 204, upon verification, the authentication server 108 may start a timer for a determined period of time, and the timer may be associated with verifying a second authentication factor. At step 206, the authentication server 108 may transmit a prompt to provide an authentication decision associated with the second authentication factor to the second endpoint device 106. In embodiments, the user may have registered the second endpoint device 106 to communicate with authentication server 108 and not the first endpoint device 104. At step 208, the second endpoint device 106 may forward the prompt to the first endpoint device 104 through the communication link 116, where the second endpoint device 106 is communicatively coupled to the first endpoint device 104 through the communication link 116. In embodiments, the prompt may be forwarded as a push notification or as any other suitable message. In embodiments, the authentication server 108 may instruct the second endpoint device 106 to forward the transmitted prompt. At step 210, the first endpoint device 104 may transmit an authentication decision comprising user input in response to the prompt to the second endpoint device 106 through the communication link 116. The authentication decision may correspond to user input in the form of selecting "accept" or "deny" on a mobile push notification, a local platform authenticator (i.e., touch ID), a biometric authenticator (i.e., fingerprint scanner), and any combination thereof.

At step 212, the second endpoint device 106 may receive the authentication decision then transmit the authentication decision to the authentication server 108 through the network 102. At step 214, the authentication server 108 may receive the authentication decision and determine if the reception of the authentication decision has occurred within the determined time period set by the timer in step 204. If the time period has elapsed or expired, the authentication server 108 may deny the first endpoint device 104 access to the requested resource 110. If the reception occurred within the time period, the authentication server 108 may proceed to analyze the authentication decision during a second multi-factor authentication procedure. At step 216, the authentication server 108 may determine if the user input provided as the authentication decision will allow or deny access for the first endpoint device 104. At step 218, the authentication server 108 may permit the first endpoint device 104 to access the resource 110 based on determining that the first endpoint device 104 successfully completed the second multi-factor authentication procedure, and the first endpoint device 104 may access the resource 110.

Figure 3:
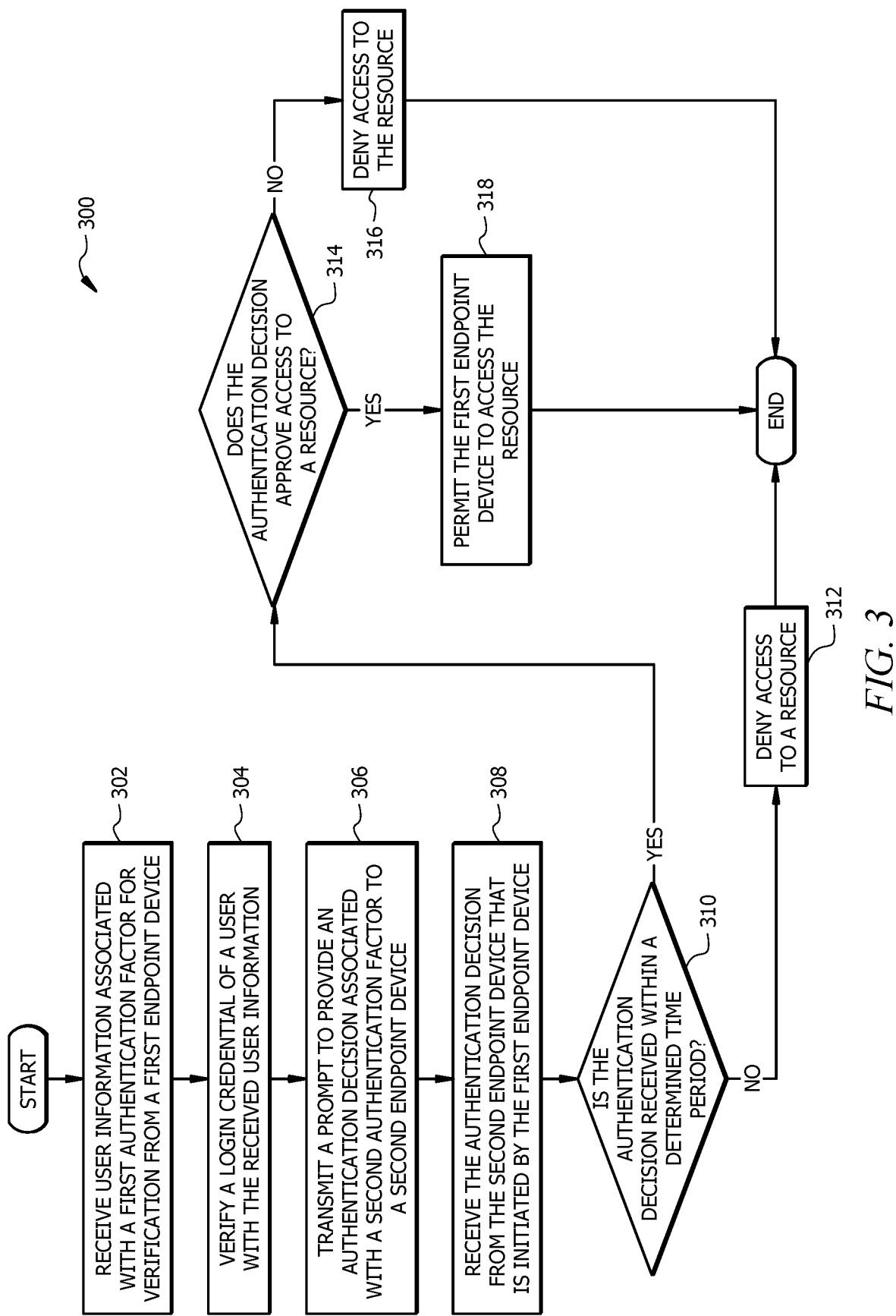
FIG. 3 illustrates an example method for authenticating a first endpoint device through a communication link with a second endpoint device.

FIG. 3 illustrates an example method 300 to authenticate the first endpoint device 104 (referring to FIG. 1) through the communication link 116 (referring to FIG. 1) with the second endpoint device 106 (referring to FIG. 1). The method 300 may begin at step 302, where the authentication server 108 (referring to FIG. 1) may receive user information associated with a first authentication factor to verify that an unknown user device can access a resource 110 (referring to FIG. 1). In embodiments, a user may be attempting to access the resource through a browser 112 (referring to FIG. 1) and/or a client application through the first endpoint device 104. The user may provide user information to prove the identity of the user. At step 304, the authentication server 108 may perform a first multi-factor authentication procedure by authenticating a first authentication factor. Authentication of the first authentication factor may be based on verifying a login credential with the received user information. In certain embodiments, access to resource 110 may be granted to first endpoint device 104 after satisfactorily performing the first multi-factor procedure if the authentication server 108 does not require multi-factor authentication. In other embodiments, the method 300 proceeds to step 306. At step 306, the authentication server 108 may transmit a prompt to provide an authentication decision associated with a second authentication factor to the second endpoint device 106. In these embodiments, the second endpoint device 106 is registered as an authorized device and first endpoint device 104 may not be registered. The authentication server 108 may concurrently start a timer for a determined period of time. In embodiments, the timer may run for any suitable amount of time. At step 308, the authentication server 108 may receive the authentication decision from the second endpoint device 106. The second endpoint device 106 may have received the authentication decision from the first endpoint device 104 through the communication link 116 established between the devices 104, 106. At step 310, the authentication server 108 may determine whether the authentication decision was received within the determined period of time set by the timer. If the time between transmitting the prompt and receiving the authentication decision exceeded the period of time, the method 300 proceeds to step 312. Otherwise, the method proceeds to step 314.

At step 312, in response to determining that the authentication decision was received after the determined period of time has expired, the authentication server 108 may deny the first endpoint device 104 access to the requested resource 110. The method 300 may then end. At step 314, in response to determining that the authentication decision was received within the determined period of time, the authentication server 108 may determine if the authentication decision approves access to the resource 110. The authentication server 108 may be configured to analyze the user input provided as the authentication decision to make this determination. If the authentication decision does not approve access, the method 300 proceeds to step 316. Otherwise, the method proceeds to step 318. At step 316, in response to determining that the authentication decision denies access to the resource 110, the authentication server 108 may deny the first endpoint device 104 access to the requested resource 110. The method 300 may then end. At step 318, in response to determining that the authentication decision approves access to the resource 110, the authentication server 108 may permit the first endpoint device 104 to access the resource 110 based on determining that the first endpoint device 104 successfully completed a second multi-factor authentication procedure. The method 300 may then end.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method to authenticate a first endpoint device through a communication link with a second endpoint device including the particular steps of the method of FIG. 3, this disclosure contemplates any suitable method for authenticating a first endpoint device through a communication link with a second endpoint device including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
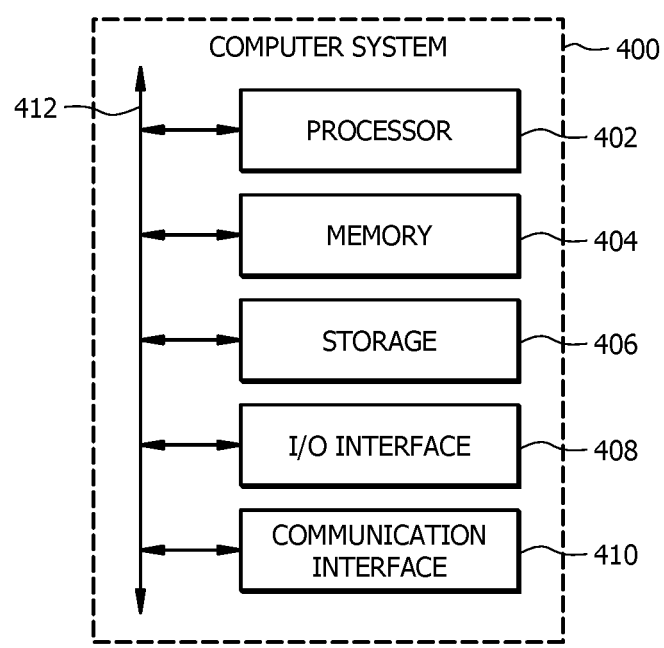
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate. Further, each one of first endpoint device 104, second endpoint device 106, and authentication server 108 in FIG. 1 may be any suitable computer system, such as the illustrated computer system 400.

This disclosure contemplates any suitable number of computer systems 400 having one or more components. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a non-transitory computer-readable storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An authentication server, comprising:
one or more processors; and
one or more computer-readable non-transitory storage media comprising instructions that, when executed by the one or more processors, cause one or more components of the authentication server to perform operations comprising:
receiving user information associated with a first authentication factor for verification from a first endpoint device;
in response to verifying the first authentication factor, transmitting a prompt to provide an authentication decision associated with a second authentication factor to a second endpoint device, wherein:
the second endpoint device is communicatively coupled to the first endpoint device through a communication link,
the second endpoint device is registered to communicate with the authentication server and the first endpoint device is not,
the first endpoint device and the second endpoint device are associated with a user,
a first instance of an authentication application is installed on the first endpoint device to facilitate communication with the authentication server; and
a second instance of the authentication application is installed on the second endpoint device to facilitate communication with the authentication server; and
receiving the authentication decision that is initiated by the first endpoint device from the second endpoint device, wherein the first endpoint device is configured to initiate and transmit the authentication decision to the second endpoint device in response to receiving the second authentication factor from the second endpoint device.

2. The authentication server of claim 1, the operations further comprising:
starting a timer for a determined period of time in response to verifying the first authentication factor.

3. The authentication server of claim 2, the operations further comprising:
if the authentication decision is received after the determined period of time has expired, denying the first endpoint device access to a resource.

4. The authentication server of claim 2, the operations further comprising:
permitting the first endpoint device access to a resource in response to a determination that the authentication decision was received within the determined period of time.

5. The authentication server of claim 1, the operations further comprising:
instructing the second endpoint device to forward the transmitted prompt as a push notification to the first endpoint device.

6. The authentication server of claim 1, the operations further comprising:
determining that the first endpoint device has requested to access a resource; and
performing a first multi-factor authentication procedure by authenticating the first authentication factor, wherein authentication of the first authentication factor is based on verifying a login credential of the user with the received user information.

7. The authentication server of claim 6, the operations further comprising:
permitting the first endpoint device to access the resource based on determining that the first endpoint device successfully completed a second multi-factor authentication procedure.

8. A method to authenticate a first endpoint device through a communication link with a second endpoint device, comprising:
receiving user information associated with a first authentication factor for verification from the first endpoint device;
in response to verifying the first authentication factor, transmitting a prompt to provide an authentication decision associated with a second authentication factor to the second endpoint device, wherein:
the second endpoint device is communicatively coupled to the first endpoint device through the communication link,
the second endpoint device is registered to communicate with an authentication server and the first endpoint device is not,
the first endpoint device and the second endpoint device are associated with a user,
a first instance of an authentication application is installed on the first endpoint device to facilitate communication with the authentication server; and
a second instance of the authentication application is installed on the second endpoint device to facilitate communication with the authentication server; and
receiving the authentication decision that is initiated by the first endpoint device from the second endpoint device, wherein the first endpoint device is configured to initiate and transmit the authentication decision to the second endpoint device in response to receiving the second authentication factor from the second endpoint device.

9. The method of claim 8, further comprising:
starting a timer for a determined period of time in response to verifying the first authentication factor.

10. The method of claim 9, further comprising if the authentication decision is received after the determined period of time has expired, denying the first endpoint device access to a resource.

11. The method of claim 9, further comprising:
permitting the first endpoint device access to a resource in response to a determination that the authentication decision was received within the determined period of time.

12. The method of claim 8, further comprising:
instructing the second endpoint device to forward the transmitted prompt as a push notification to the first endpoint device.

13. The method of claim 8, further comprising:
determining that the first endpoint device has requested to access a resource; and
performing a first multi-factor authentication procedure by authenticating the first authentication factor, wherein authentication of the first authentication factor is based on verifying a login credential of the user with the received user information.

14. The method of claim 13, further comprising:
permitting the first endpoint device to access the resource based on determining that the first endpoint device successfully completed a second multi-factor authentication procedure.

15. A non-transitory computer-readable medium comprising instructions that are configured, when executed by a processor, to:
receive user information associated with a first authentication factor for verification from a first endpoint device;
in response to verifying the first authentication factor, transmit a prompt to provide an authentication decision associated with a second authentication factor to a second endpoint device, wherein:
the second endpoint device is communicatively coupled to the first endpoint device through a communication link,
the second endpoint device is registered to communicate with an authentication server and the first endpoint device is not,
the first endpoint device and the second endpoint device are associated with a user,
a first instance of an authentication application is installed on the first endpoint device to facilitate communication with the authentication server; and
a second instance of the authentication application is installed on the second endpoint device to facilitate communication with the authentication server; and
receive the authentication decision that is initiated by the first endpoint device from the second endpoint device, wherein the first endpoint device is configured to initiate and transmit the authentication decision to the second endpoint device in response to receiving the second authentication factor from the second endpoint device.

16. The non-transitory computer-readable medium of claim 15, wherein the instructions are further configured to:
start a timer for a determined period of time in response to verifying the first authentication factor.

17. The non-transitory computer-readable medium of claim 16, wherein the instructions are further configured to:
if the authentication decision is received after the determined period of time has expired, deny the first endpoint device access to a resource.

18. The non-transitory computer-readable medium of claim 16, wherein the instructions are further configured to:
permit the first endpoint device access to a resource in response to a determination that the authentication decision was received within the determined period of time.

19. The non-transitory computer-readable medium of claim 15, wherein the instructions are further configured to:
instruct the second endpoint device to forward the transmitted prompt as a push notification to the first endpoint device.

20. The non-transitory computer-readable medium of claim 15, wherein the instructions are further configured to:
determine that the first endpoint device has requested to access a resource;
perform a first multi-factor authentication procedure by authenticating the first authentication factor, wherein authentication of the first authentication factor is based on verifying a login credential of the user with the received user information; and
permit the first endpoint device to access the resource based on determining that the first endpoint device successfully completed a second multi-factor authentication procedure.

* * * * *